United States Patent [19]
Phillips

[11] Patent Number: 5,414,557
[45] Date of Patent: May 9, 1995

[54] RETICLE APPARATUS FOR NIGHT VISION DEVICES

[75] Inventor: Earle N. Phillips, Roanoke, Va.

[73] Assignee: ITT Corporation, New York, N.Y.

[21] Appl. No.: 220,392

[22] Filed: Mar. 30, 1994

Related U.S. Application Data

[63] Continuation of Ser. No. 982,882, Nov. 30, 1992, abandoned.

[51] Int. Cl.$^6$ .................. G02B 23/00; H01J 31/50
[52] U.S. Cl. .................... 359/428; 359/400; 359/424; 250/214 VT
[58] Field of Search ................. 359/362–363, 359/399, 424, 427–429, 505, 400; 385/88–94, 119, 120; 356/150, 151, 153, 250–252; 250/214 VT; 313/524, 526, 528

[56] References Cited

U.S. PATENT DOCUMENTS 2,435,074  1/1948  Frey ........................ 359/428
4,792,673 12/1988  Blackler ............... 250/214 VT
4,981,331  1/1991  Taylor ..................... 359/428

Primary Examiner—Scott J. Sugarman
Assistant Examiner—Thong Nguyen
Attorney, Agent, or Firm—Arthur L. Plevy; Patrick M. Hogan

[57] ABSTRACT

Reticle apparatus that is affixed to the output surface of an image intensifier tube fiber optic element in a night vision goggle system. One embodiment provides for an illuminated reticle pattern. The reticle pattern is etched into a glass substrate which is then filled by a light reflective material. At least one light emitting diode (LED) is positioned adjacent to the edge of the substrate. Light from the LED is then received by the edge of the substrate which then illuminates the reticle pattern. An alternate embodiment provides for a reticle pattern that is affixed to an output surface of a fiber optic element wherein the output surface is curved. The reticle pattern is formed on a clear, flexible substrate that is able to conform the curvature of the output surface. The substrate is affixed to curved output surface by an adhesive that is coated on the flexible substrate.

20 Claims, 3 Drawing Sheets

RETICLE APPARATUS FOR NIGHT VISION DEVICES

This is a Continuation Application under 37 C.F.R. 1.62 of prior Ser. No. 07/982,882, filed on Nov. 30, 1992, now abandoned.

FIELD OF THE INVENTION

This invention relates to night vision devices and more particularly, to a single tube night vision goggle system having a reticle apparatus affixed to a fiber optic element of the system.

BACKGROUND OF INVENTION

Night vision devices are well known in the art. Generally, these devices include an objective lens, image intensifier tube and an eyepiece or ocular lens assembly. There are various types of night vision devices. In one type, the ocular lens assembly may be replaced by a relay lens so as to enable photographic recording of images. In another type, the standard objective lens may be replaced with a larger objective lens to enable use of the device as a binocular viewer, long range observation system or weaponsight. In addition, the device may be used as a remote viewer by utilizing a video sensor in conjunction with the image intensifier tube. Some of these devices provide reticle patterns that are useful for military applications such as range estimating and aiming of weapon fire. In regard to weaponsights, reference is made to copending U.S. patent application Ser. No. 07/647,544 entitled NIGHT SIGHT FOR MISSILE LAUNCHER by Phillips et al., filed on Jan. 29, 1991 and Ser. No. 07/785,048 entitled TELESCOPIC SIGHT FOR DAY/NIGHT VIEWING by Earle N. Phillips, filed on Oct. 30, 1991 and assigned to ITT Corporation, the assignee herein.

Other night vision devices are configured as night vision goggle systems. These systems are used at night by individuals to enhance their ability to perform tasks such as walking, driving, observation, map reading, and others. One type of system is the single tube night vision goggle system which is presently fabricated by various manufacturers. In this regard, reference is made to U.S. Pat. No. 3,781,560 entitled NIGHT VIEWING SYSTEM FOR READING WITHOUT LIGHT which issued to DeBurgh et. al. on Dec. 25, 1973, U.S. Pat. No. 4,266,129 entitled DEVICE FOR VIEWING RESIDUAL LIGHT IN THE VISIBLE AND THE NEAR INFRARED SPECTRUM which issued to Versteeg et. al. on May 5, 1981 and assigned to N.V. Optische Industrie "De Oude Delft", Delft, Netherlands, U.S. Pat. No. 4,392,710 entitled OPTICAL APPARATUS which issued to Rogers on Jul. 12, 1983 and assigned to Pilkington P.E. Limited, England and U.S. Pat. No. 4,463,252 entitled NIGHT VISION GOGGLE SYSTEM which issued to Brennan et al. on Jul. 31, 1984 and assigned to Baird Corporation.

Two types of night vision goggle systems are the AN/PVS-7A and AN/PVS-7B. These systems include an objective lens assembly, image intensifier assembly and an ocular lens system. The ocular lens system further includes a collimator lens assembly and dual relay lens assembly. The collimator lens assembly is positioned to provide a collimated output image of the image intensifier output screen. The relay lens assembly then relays the collimated image from the collimator lens assembly to the user's eye for viewing. Commercial versions of these systems have been converted into night vision binoculars by the addition of longer focal length objective lenses to provide greater magnification. In addition, ITT Electro Optical Products Division of ITT Corporation in Roanoke, Va. has manufactured night vision binoculars for the US military having 3X and 4.5X magnification. Many of these devices utilize GEN II and GEN III image intensifier tubes, which are well known in the industry.

Many manufacturers provide reticle patterns with these prior art systems. Reticle patterns are useful in many military operations. Such operations include forward observer and fire control missions, where reticle patterns are utilized in order to provide accurate range estimating and aiming of weapon fire. As is known in the art, it is desirable that the reticle pattern be positioned at an image plane so that it is in focus to the user. However, this has not been achieved by manufacturers of such systems.

In most single tube systems, including the AN/PVS-7A and AN/PVS-7B, a fiber optic element and a collimator lens are provided. In regard to fiber optic elements, reference is made to U.S. Pat. No. 5,029,963 entitled REPLACEMENT DEVICE FOR A DRIVER'S VIEWER which issued to Naselli et al. on Jul. 9, 1991 and assigned to ITT Corporation. Typically, the fiber optic element in such systems is recessed inside the image intensifier housing. The fibers of the fiber optic element are formed to provide an output surface having a radius of curvature for the correction of field curvature or other distortion of an image plane. The radius of curvature is matched to the collimator lenses and reverses the expected field curvature of the output image of the collimator lenses. As is known in the art, the image plane is defined by the fiber optic element. Consequently, it is difficult to affix a reticle pattern on the curved output surface of the fiber optic element utilizing techniques known in the art.

Such systems further include a relay lens assembly having a fold mirror. The relay lens assembly serves to reinvert the image produced by the tube in order to provide upright viewing for the user. The relay lens assembly forms an image plane in the middle of the relay lens. This image plane is located at the position where the fold mirror bisects the image at an angle (typically 45 degrees), making the image plane inaccessible for placement of a reticle pattern.

Various methods have been utilized by the prior art to provide a reticle pattern in such systems. A method is to optically project a reticle image through the objective lens assembly and into the input of the image intensifier assembly. In this method, the reticle pattern is not positioned on an image plane. This results in an indistinct and blurred reticle pattern since it is not in focus. In addition, this method introduces undesirable stray light into the objective lens.

Another technique includes etching a reticle pattern on a curved glass substrate. This substrate is then optically bonded onto the curved output surface of the image intensifier fiber optic element. However, this approach has disadvantages. A disadvantage is that spherical aberration occurs due to the thickness of the glass substrate. In addition, the cost of the curved glass reticle is high. Furthermore, it is difficult to remove the bonded reticle without damaging the image intensifier tube.

Moreover, in order to provide maximum effectiveness on very dark nights, it is desirable that the reticle pattern be illuminated so as to provide contrast against dark backgrounds. In addition, it would be advantageous to have the reticle pattern illuminated in a color which contrasts with the green phosphor output provided by the image intensifier tube. It is also desirable that the intensity of the illumination be adjustable for optimum contrast under varying night conditions. As can be ascertained, a reticle pattern generally cannot be displayed in a contrasting color by utilizing the previously described method of optically projecting the reticle pattern as utilized by the prior art.

SUMMARY OF THE INVENTION

In a first embodiment, an illuminated reticle apparatus is provided for a night vision goggle system having an image intensifier tube which includes a fiber optic element having an output surface. The reticle apparatus comprises a substantially transparent substrate having an outer peripheral edge for receiving light wherein said substrate is affixed to said output surface. In addition, a reticle pattern is formed on said substrate, wherein said reticle pattern is illuminated by said light received by said edge.

In an alternate embodiment, the reticle apparatus comprises a substantially transparent, flexible substrate affixed to said output surface that conforms to said output surface wherein a reticle pattern is formed on said substrate.

DETAILED DESCRIPTION

Figure 1:
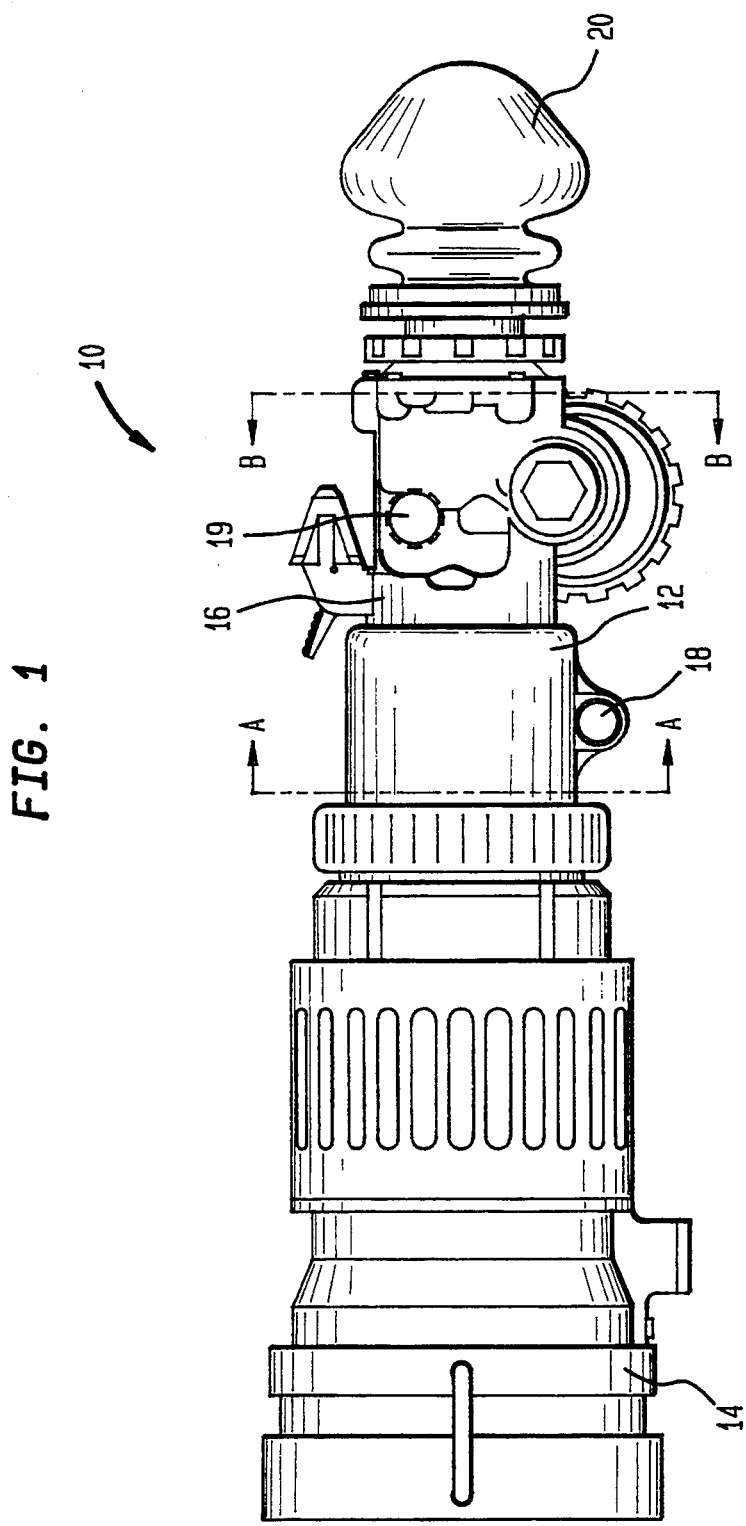
FIG. 1 is a side view on an AN/PVS-7B night vision goggle system which includes an adaptor member that houses an illuminated reticle in accordance with an embodiment of the present invention.

There are many types of night vision binocular systems known in the art. ITT Electro Optical Products Division of ITT Corporation in Roanoke, Va. manufactures night vision binocular systems designated as ITT F4939 4.5X Binocular and ITT F4940 3X Binocular. Other night vision systems include the AN/PVS-7A and AN/PVS-7B. Referring to FIG. 1, a night vision goggle system 10 is shown in which an adaptor member 12 in accordance with the present invention is positioned between an objective lens 14 and an eyepiece or ocular lens assembly 16 of an AN/PVS-7B body. The objective lens 14 is removably secured to the adaptor member 12 to enable interchangeability of the objective lens 14 as required. The adaptor member 12 is then secured to the ocular lens system 16. It is understood that the present invention may be applied to all night vision devices which utilize image intensifier tubes. This includes single tube night vision goggles, night vision binoculars and binocular ocular assemblies.

The objective lens 14 produces an image that forms the input to an image intensifier tube 24 (FIG. 2) housed within the adaptor member 12. The objective lens 14 may be a standard lens or a lens that provides suitable magnification for use in a binocular system. By way of example, 3X and 4.5X magnification objective lens have been utilized.

As will be explained, the adaptor member 12 also houses a reticle module 26 (FIG. 2) which includes a reticle pattern that may be illuminated so as to provide contrast against dark backgrounds. Such a reticle pattern aids a user in the performance of various military operations such as forward observer and fire control missions. The adaptor member 12 further includes a rotary control knob 18 which is utilized by the user for controlling the brightness of the reticle pattern as will be explained hereinafter. The ocular lens system 16 (FIG. 1) includes a relay lens system (not shown) and is utilized by the user to view the output of the tube with the reticle pattern. The ocular lens system 16 further includes a control switch 19 which is utilized by the user to turn the night vision goggle system 10 on or off as desired. An eye shield 20 is positioned on the ocular lens system 16 to shield the user's eyes from undesirable stray light and to enable comfortable positioning of the night vision goggle system 10 on the user.

Figure 2:
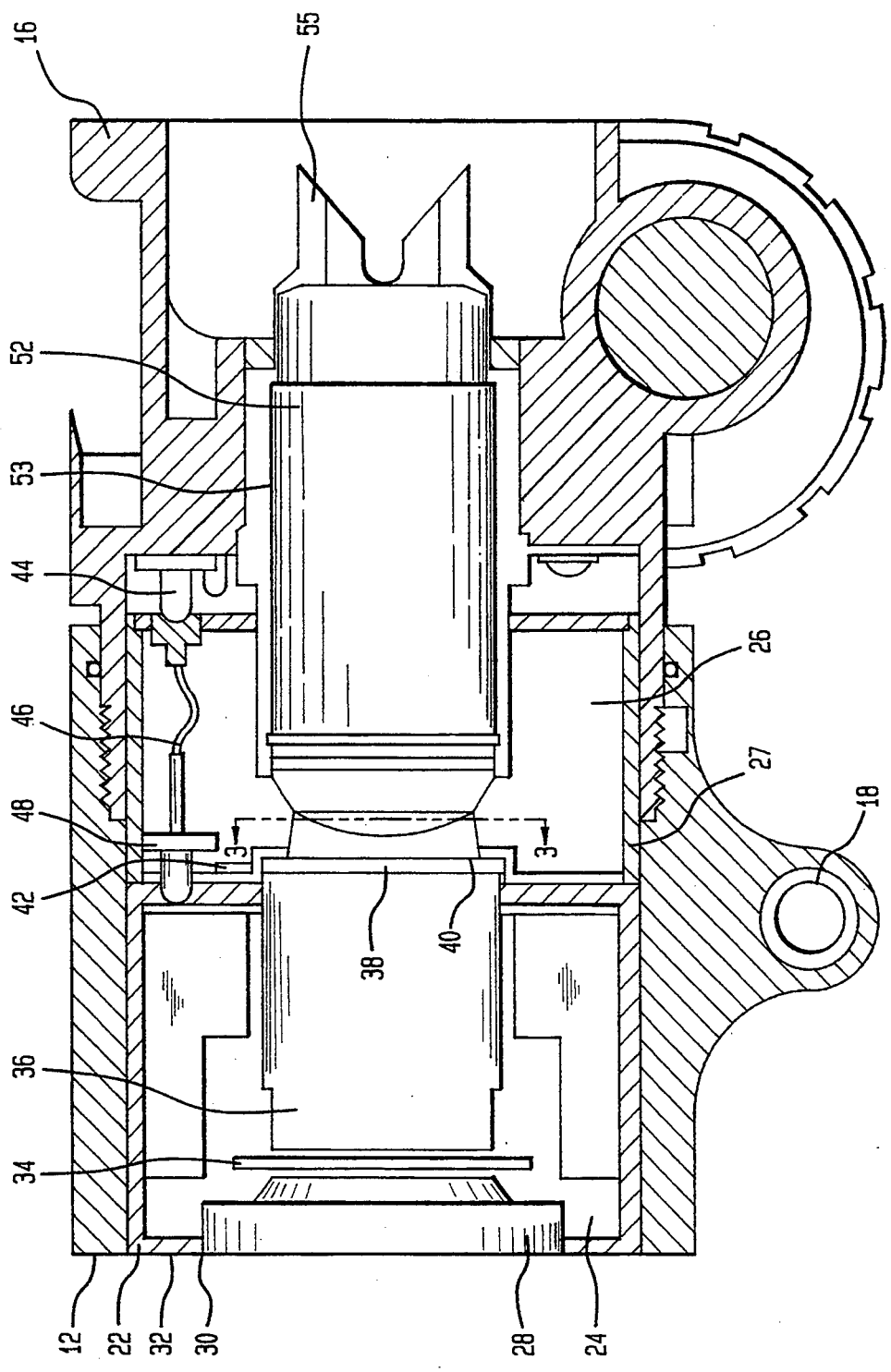
FIG. 2 is a cross sectional side view along section lines A—A and B—B of FIG. 1 showing an image intensifier tube reticle substrate, collimator and a portion of an ocular lens assembly.

Referring to FIG. 2, a side cross sectional view between section lines A—A and B—B of FIG. 1 is shown which includes the adaptor member 12 and a portion of the ocular lens system 16 previously described. The adaptor member 12 has a light input end 22 through which the image produced by the objective lens 14 passes. The adaptor member 12 further includes the tube 24 and the reticle module 26. Image intensifier tubes are well known in the art. The present embodiment utilizes a GEN III type image intensifer tube configured as a universal tube assembly designated as military part number MX-10130. In this regard, reference is made to U.S. Pat. No. 5,077,611 entitled UNIVERSAL IMAGE INTENSIFIER TUBE which issued to Phillips et al. on Dec. 31, 1991 and assigned to ITT Corporation, the assignee herein. Alternately, a GEN II type image intensifier tube may be used. The tube 24 includes a photocathode 28 which is secured at an open end 30 of a housing 32. The housing 32 is positioned within the adaptor member 12 such that the photocathode 28 is at the light input end 22 of the adaptor member 12 for receiving the image produced by the objective lens 14. A microchannel plate 34 is positioned adjacent to the photocathode 28 and also secured to the housing 32. In regard to image intensifier tubes, reference is made to U.S. Pat. No. 5,023,511 entitled OPTICAL ELEMENT OUTPUT FOR AN IMAGE INTENSIFIER DEVICE which issued to Earle N. Phillips on Jun. 11, 1991 and assigned to ITT Corporation.

Generally, image intensifier tubes include a fiber optic element which is recessed inside the housing. In regard to fiber optic elements, reference is made to U.S. Pat. No. 5,029,963 entitled REPLACEMENT DEVICE FOR A DRIVER'S VIEWER which issued to Naselli et al. on Jul. 9, 1991 and assigned to ITT Corporation. As is known in the art, the fibers of the fiber optic element are formed to provide an output surface having a radius of curvature for the correction of field curvature or other distortion of an image plane. It is known that the image plane is defined by the fiber optic element. Consequently, it is difficult to install a reticle pattern on the curved output surface of the fiber optic element utilizing techniques known in the art.

There are several types of fiber optic elements available in the prior art. In the present embodiment, an extended plano fiber optic element 36 is provided that extends beyond the housing 32 and into the reticle module 26, thus making the fiber optic element 36 accessible. In this way, a flat substrate may be attached to plano fiber optic element. Moreover, such a reticle pattern may then be illuminated.

The reticle module 26 is positioned adjacent to the tube 24 and secured within the adaptor member 12. The reticle module 26 includes an enclosure 27 that houses a reticle substrate 38, a plurality of light emitting diodes 42 (only one is shown for clarity in FIG. 2), collimator assembly 52, reticle power contact 44 and tube power contact 48 as will be explained hereinafter. Due to the addition of the reticle module 26, the length of a typical AN/PVS-7B night vision goggle system utilizing a 4.5X objective lens is increased approximately 0.945 inch.

The reticle substrate 38 is positioned adjacent to the fiber optic element 36 and thus at or near the image plane (not shown). The substrate 38 is bonded to fiber optic element 36 by an adhesive. Alternately, the substrate 38 may be positioned away from the fiber optic element 36 by using a spacer such as double sided tape and then secured within the module. The use of such a spacer prevents the appearance of undesirable fringe patterns between the fiber optic element 36 and the substrate 38.

The substrate 38 is essentially clear and flat and has an outer peripheral edge 40. In addition, the substrate 38 may be fabricated from any suitable material through which the output of the tube 24 passes with relatively little distortion. One such material is optical crown glass type 523-586 as per military specification G-174, Grade B, annealed.

Figure 3:
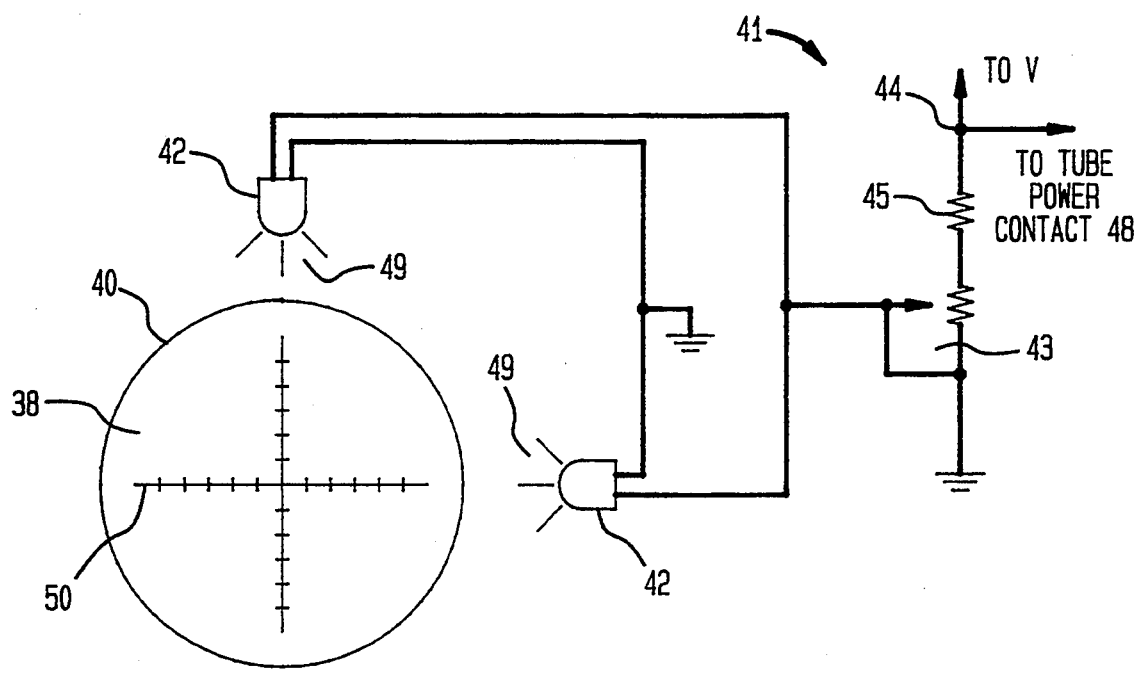
FIG. 3 is view along section line 3—3 of FIG. 2 which shows a reticle pattern on a flat, glass substrate and a an illumination circuit for illuminating the reticle pattern.

The light emitting diodes (LED's) 42 are positioned adjacent to the peripheral edge 40 of the substrate 38 and are secured to the reticle module 26. Referring to FIG. 3, there is shown a view of the substrate 38 and the LED's 42 along section line 3—3 of FIG. 2. FIG. 3 further includes a schematic for an illumination circuit 41 for illuminating the LED's 42.

Any desired reticle pattern may be formed on the substrate. In FIG. 3, a stadia line reticle pattern 50 formed on the substrate 38 is shown. The reticle pattern 50 may be formed on the substrate 38 by etching a surface of the substrate 38 and then filling with a light reflective material such as titanium dioxide. The line width of the reticle pattern 50 may be any suitable size but is typically approximately 0.10 mm. Moreover, the reticle pattern 50 may be as large as the system field of view. Alternately, a graphic display pattern of any desired configuration may be formed on the substrate 38.

In FIG. 3, two LED's 42 are shown positioned adjacent to the peripheral edge 40 of the substrate 38 and are separated by approximately 90 degrees. The use of two LED's 42 and a 90 degree angle results in a relatively uniform illumination across the substrate 38. It is understood that other angles utilizing a suitable number of LED's 42 may also be employed. Each of the LED's 42 has a cathode terminal electrically connected to ground. In addition, each of the LED's has an anode terminal electrically connected to a reticle potentiometer 43. Furthermore, the potentiometer 43 is electrically connected to ground and to a current limiting resistor 45.

The potentiometer 43 is utilized to adjust the voltage supplied to the LED's and thus the brightness of the LED's 42 and the reticle pattern 50. The potentiometer 43 further includes a switch (not shown) for turning the LED's on or off. Referring to FIG. 2 in conjunction with FIG. 3, the user turns the LED's on or off and adjusts the brightness of the reticle pattern 50 by manipulation of the rotary control knob 18.

The resistor 45 is then electrically connected to a power supply V by reticle power contact 44. The resistor 45 is used to prevent damage to the LED's 42 due to excess current. In addition, the reticle power contact 44 is electrically connected by wire 46 to a tube power contact 48. The power supply V provides a voltage potential to the LED's 42 and the tube 24. Typically, 3 Volts DC are provided to illuminate the LED's 42 and operate the tube 24. A similar design has been utilized in copending U.S. patent application Ser. No. 07/647,544 entitled NIGHT SIGHT FOR MISSILE LAUNCHER by Phillips et al., filed on Jan. 29, 1991 and assigned to ITT Corporation.

Referring to FIG. 2, the collimator assembly 52 is positioned adjacent to the substrate 38 and extends through the reticle module 26 and into a cavity 53 in the ocular lens assembly 16. The collimator assembly 52 provides a collimated output image of the tube output screen. The relay lens system of the ocular lens system 16 then relays the collimated output image from the collimator lens assembly 52 for viewing by the user by means of a viewer element 55.

The operation of the present invention will now be described by referring to FIG. 2 in conjunction with FIG. 3. When the LED's are off, the reticle pattern 50 appears as black lines against the green phosphor output image of the tube 24. The user may then manipulate the rotary control knob 18 and switch on the LED's 42. The light 49 from the LED's 42 is then received by the peripheral edge 40 of the substrate 38 and then transmitted within the substrate 38 to the reticle pattern 50, thus illuminating the reticle pattern 50. As can be ascertained, the reticle pattern 50 appears as the color of the illuminating LED's. Consequently, the reticle pattern 50 contrasts against the green phosphor image, thus enhancing the visibility of the reticle. Standard red LED's 42 have been found to provide good contrast with the green phosphor image provided by the tube 24. The brightness of the LED's 42 and the reticle pattern 50 may be adjusted by the user as desired by manipulating the rotary control knob 18 to provide maximum contrast under varying conditions.

Figure 4:
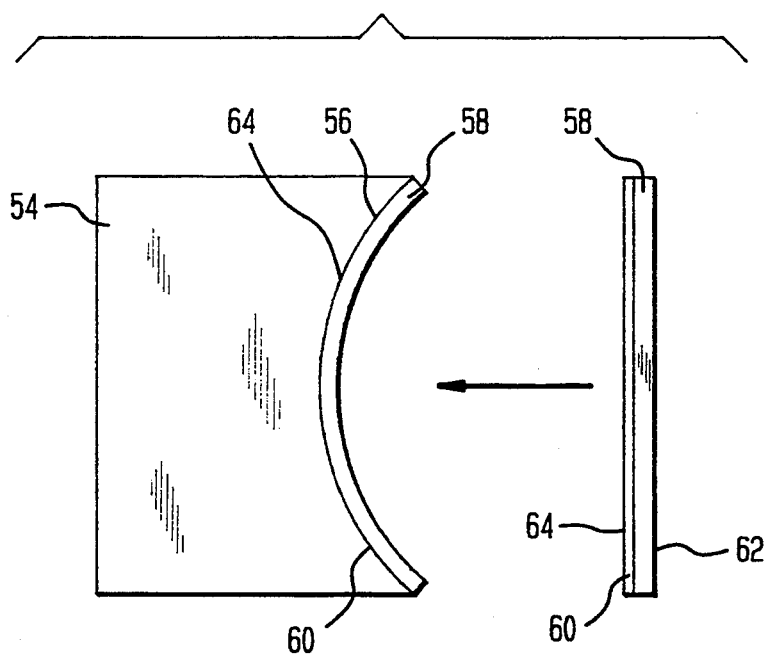
FIG. 4 is a side view for an alternate embodiment of a flexible and transparent reticle substrate.

An alternate embodiment of the present invention is shown in FIG. 4. The alternate embodiment utilizes the latest developments in thin, optically transparent materials for label and graphics applications. In FIG. 4, a side view of a fiber optic element 54 as previously described is shown. The element 54 has a curved output surface 56 which defines an image plane (not shown). Other known elements of image intensifier tubes are not shown for purposes of clarity. Moreover, FIG. 4 shows a side view of a relatively thin, flexible and transparent substrate 58. The flexible substrate 58 may be fabricated from any suitable material that has sufficient flexibility to enable the flexible substrate 58 to conform to the curved surface 56 of the element 54. Additionally, the flexible substrate 58 is fabricated from any suitable material that provides maximum optical transparency and does not introduce spherical aberrations to the output image of the tube 24. Such materials are vinyl, mylar, lexan or polyethylene.

The flexible substrate 58 includes a first surface 60 on which a desired reticle pattern or graphic display is formed and an opposed second surface 62. The reticle pattern 50 or graphic display may be formed by any method known in the art. One such method includes printing the reticle pattern 50 or graphic display on the first surface 60. An adhesive 64 is then applied to the first surface 60.

In the alternate embodiment, the first surface 60 of the flexible substrate 58 is positioned directly on the curved surface 56 of the element 54 and is bonded by the adhesive 64 to the curved surface 56. Due to its flexibility, the flexible substrate 58 is able to conform to the curved surface 56. Moreover, since the reticle pattern 50 is formed on the first surface 60, positioning the flexible substrate 58 in this manner enables the reticle pattern 58 to be at or near the image plane regardless of the thickness of the flexible substrate 58. Alternately, if a sufficiently thin flexible substrate 58 is utilized, the reticle pattern 50 could be formed on the second surface 62 so as to enable the reticle pattern 50 to be as near as possible to the image plane. Moreover, it is understood that the flexible substrate 58 may also be affixed to flat surfaces.

The flexible substrate 58 could be produced with a peel-off backing, such that a plurality of labels could be provided in roll or sheet form, as is currently done with adhesive backed labels. In this manner, the "label" approach is much less expensive than producing reticle patterns on a curved glass substrate.

What is claimed is:

1. An illuminated reticle apparatus for a night vision goggle system, said night vision goggle system including an image intensifier tube and a fiber optic element aligned with said tube having an output surface upon which a monochromatic output image is displayed, comprising:
    a substantially transparent substrate having an outer peripheral edge for receiving light and having a surface affixed to said output surface;
    a light source disposed proximate said outer peripheral edge for selectively directing light through said outer peripheral edge into said substrate, said light being of a color that optically contrasts said monochromatic output image; and
    opaque material disposed on said substrate in the form of a predetermined reticle pattern, wherein said opaque material reflects the light produced by said light source, thereby illuminating said reticle pattern in light that optically contrasts the monochromatic output image.

2. The apparatus according to claim 1, further including a brightness adjustment means, coupled to said light source, for adjusting the brightness of said light, thereby enabling the adjustment of the brightness of said reticle pattern to accommodate varying illumination conditions.

3. The apparatus according to claim 1, wherein said light source includes at least one light emitting diode positioned adjacent to said edge.

4. The apparatus according to claim 1, wherein said substrate is attached to said output surface by an adhesive bonding agent.

5. The apparatus according to claim 1, said opaque material is disposed in grooves etched on said substrate.

6. The apparatus according to claim 5, wherein said light reflective material is titanium dioxide.

7. The apparatus according to claim 1, wherein said substrate is attached to said output surface using double sided tape, said tape being of sufficient thickness to prevent the appearance of undesirable fringe patterns between said output surface and said substrate.

8. The apparatus according to claim 1, wherein one surface of said fiber optic element is curved.

9. The apparatus according to claim 1, wherein said substrate is formed from a flexible material, said substrate being adapted to conform to one surface of said fiber optic element.

10. The apparatus according to claim 9, wherein said reticle pattern is printed on said substrate.

11. The apparatus according to claim 9, wherein said flexible material is selected from the class consisting of lexan, mylar, vinyl, and polyethylene.

12. The apparatus according to claim 1, wherein said substrate is formed from optical annealed crown glass.

13. A reticle illumination system for use with an intensifying night sight, said system comprising:
    an image intensifier tube having an output surface upon which a monochromatic output image is displayed;
    a substantially transparent substrate having an outer peripheral edge for receiving light and having a surface attached to said output surface of said image intensifier tube;
    a light source disposed proximate said outer peripheral edge for selectively directing light through said outer peripheral edge into said substrate, said light being of a color that optically contrasts said monochromatic output image; and
    opaque material disposed on said substrate in the form of a predetermined reticle pattern, wherein said opaque material reflects the light produced by said light source, thereby illuminating said reticle pattern in light that optically contrasts the monochromatic output image.

14. The system of claim 13, wherein said output surface is curved and said substrate conforms to said output surface.

15. The system of claim 14, wherein said substrate is flexible.

16. The system of claim 15, wherein said substrate is selected from a group of materials consisting of lexan, mylar, vinyl, and polyethylene.

17. The system according to claim 14, wherein said reticle pattern is printed on said substrate.

18. The system according to claim 14, further including means for adjusting the brightness of said light, source thereby enabling the adjustment of the brightness of said reticle pattern to accommodate varying illumination conditions.

19. The system according to claim 14, wherein said light source includes one light emitting diode for emitting light receivable by said edge.

20. The system according to claim 13, wherein said output surface is planar and wherein said substrate is attached to said output surface.

* * * * *